US009487067B2

(12) United States Patent
Kwon

(10) Patent No.: US 9,487,067 B2
(45) Date of Patent: Nov. 8, 2016

(54) FIXTURE FOR A VEHICLE

(71) Applicant: DAEHAN SOLUTION CO., LTD., Incheon (KR)

(72) Inventor: Choong Ho Kwon, Seoul (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 0 days.

(21) Appl. No.: 14/633,511

(22) Filed: Feb. 27, 2015

(65) Prior Publication Data

US 2016/0114735 A1  Apr. 28, 2016

(30) Foreign Application Priority Data

Oct. 24, 2014  (KR) .................. 10-2014-0145425

(51) Int. Cl.
*B60J 5/00* (2006.01)
*B60J 5/04* (2006.01)

(52) U.S. Cl.
CPC ................... *B60J 5/0468* (2013.01)

(58) Field of Classification Search
CPC ............................ B60R 11/00; B60J 5/0468
USPC ......... 296/214, 97.9, 1.02; 24/289, 293, 297
See application file for complete search history.

(56) References Cited

U.S. PATENT DOCUMENTS

| | | | |
|---|---|---|---|
| 4,989,911 A * | 2/1991 | Van Order | B60J 3/0217 248/27.3 |
| 5,056,853 A | 10/1991 | Van Order | |
| 5,186,517 A | 2/1993 | Gilmore | |
| 5,201,564 A | 4/1993 | Price | |
| 5,722,124 A | 3/1998 | Wisniewski | |
| 5,752,853 A | 5/1998 | Curtindale | |
| 5,967,589 A | 10/1999 | Spadafora | |
| 6,003,928 A | 12/1999 | Curtindale | |
| 6,007,136 A | 12/1999 | Zittwitz | |
| 6,021,986 A | 2/2000 | Murdock | |
| 6,234,558 B1 | 5/2001 | Curtindale | |
| 6,606,766 B2 * | 8/2003 | Ko | B60J 3/0217 24/293 |
| 6,773,051 B2 | 8/2004 | Davey | |
| 6,857,168 B2 | 2/2005 | Lubera | |
| 7,900,953 B2 | 3/2011 | Slobodecki | |

(Continued)

FOREIGN PATENT DOCUMENTS

| KR | 10-2013-0090942 A | 8/2013 |
|---|---|---|
| KR | 1359424 B1 | 1/2014 |
| KR | 1391230 B1 | 4/2014 |

*Primary Examiner* — Joseph D Pape
(74) *Attorney, Agent, or Firm* — Bacon & Thomas, PLLC

(57) ABSTRACT

A fixture for a vehicle, which is configured so that a plurality of retaining arms inserted into and caught by a coupling hole formed in a body panel are located on an imaginary circle, and arranged in the form of a cone so as to absorb an external force, thereby being easily assembled, and which is capable of dispersing and absorbing twisting generated when an indoor handle installed using the fixture is used. In the fixture for the vehicle, even-numbered retaining arms are formed to face each other on the imaginary circle, such that an external force generated when the indoor handle is used is dispersed and absorbed regardless of an applied direction of the external force, and a separation or an escape of the fixture is prevented, and thus a noise and a safety accident are reduced.

8 Claims, 7 Drawing Sheets

(56) References Cited

U.S. PATENT DOCUMENTS

| | | |
|---|---|---|
| 8,038,167 B2 | 10/2011 | Slobodecki |
| 8,845,003 B2 | 9/2014 | Still |
| 2001/0032377 A1 | 10/2001 | Lubera |
| 2004/0004368 A1 | 1/2004 | Davey |
| 2011/0101726 A1* | 5/2011 | Moenter ............... B60J 3/0221 296/97.9 |
| 2011/0127795 A1* | 6/2011 | Still ..................... B60J 3/0213 296/97.9 |

* cited by examiner

FIXTURE FOR A VEHICLE

CROSS-REFERENCE TO RELATED APPLICATION

This application claims priority to and the benefit of Korean Patent Application No. 10-2014-0145425, filed on Oct. 24, 2014, the disclosure of which is incorporated herein by reference in its entirety.

BACKGROUND

1. Field of the Invention

The present invention relates to a fixture for a vehicle, and more particularly, to a fixture for a vehicle, in which a plurality of retaining arms substantially serving as stoppers are arranged in the form of a cone so that an external force transmitted from an outer side to, for example, an indoor handle is equally dispersed to each retaining arm, and the fixture is prevented from being escaped or separated from a coupling hole formed in a body panel, and thus noise is reduced, and a safety accident generated when the indoor handle falls into an interior of the vehicle is prevented.

2. Discussion of Related Art

Generally, various construction elements are assembled in a vehicle using a fixture. For example, the construction elements include a room lamp, a head lamp, and an indoor auxiliary handle. At this time, the used fixture may be separately manufactured and used according to each construction element. However, in an aspect of productivity and cost reduction, one kind of fixture is generally developed and applied to all places which are required to be coupled in a clip manner. Patent documents 1 to 3 show examples in which a module clip capable of being used in another construction element is used to fix a headliner.

Patent documents 1 provides an indoor handle fixture for a headliner module of a vehicle, in which a base 110 assembled between a body panel 10 and a headliner 20 is provided at a base end, and a hook 120 integrally bent from the base 110 to be inserted and coupled into a coupling hole 11 of the body panel 10 is formed at a fore-end, wherein the hook 120 includes two pairs of supporting arms 121 having supporting portions 121*a* bent from both sides of the base 110 to be inclined upward in directions facing each other and flanges 121*b* bent downward from upper ends of the supporting portions 121*a*, one pair of retaining arms 123 formed between the two pairs of supporting arms 121 to be bent from centers of the flanges 121*b* and to be inclined downward in directions far away from each other, retaining portions 124 bent from lower ends of the retaining arms 123 to be inclined downward in directions facing each other, retaining jaws 125 bent downward from lower ends of the retaining portions 124 to be caught by a circumferential surface 11*a* of the coupling hole 11 of the body panel 10, and insertion guide beads 126 formed at centers of the retaining arms 123 to extend from upper ends to lower ends and to protrude in directions far away from each other.

Patent document 2 relates to an indoor handle fixture for a headliner module of a vehicle, which has a simple manufacturing process and a low manufacturing cost, and is configured to restrict generation of noise when being installed and used in the vehicle. In the indoor handle fixture for the headliner module of the vehicle, in which a base 110 assembled between a body panel 10 and a headliner 20 is provided at a base end, and a hook 120 integrally bent from the base 110 to be inserted and coupled into a coupling hole 11 of the body panel 10 is formed at a fore-end, the hook 120 includes supporting arms 121*a* bent from both sides of the base 110 to be inclined upward in directions facing each other and flanges 121*b* formed to extend from upper ends of the supporting arms 121*a* to both sides of the supporting arms 121*a* and to be bent downward, two pairs of retaining arms 122 bent from both sides of the flanges 121*b* to be inclined downward in directions far away from each other, retaining portions 123 bent from lower ends of the retaining arms 122 to be inclined downward in directions facing each other, retaining jaws 124 bent downward from lower ends of the retaining portions 123 to be caught by a circumferential surface 11*a* of the coupling hole 11 of the body panel 10, and at least one noise preventing protrusion 125 formed to restrict generation of noise due to mutual contact of the flanges 121*b* configured to protrude from opposed surfaces of the flanges 121*b* to face each other.

Patent document 3 relates to an indoor handle fixture for a headliner module of a vehicle, including a base 110 assembled between a body panel 10 and a headliner 20, and a hook 120 bent from the base 110 to be inserted and coupled into a coupling hole 11 of the body panel 10, wherein the hook 120 includes one pair of supporting arms 121 generally formed in a "T" shape and having flanges 121*a* bent from upper ends thereof to face each other and to be in contact with each other, retaining arms 122 formed to gradually extend outward from upper horizontal sides of the supporting arms 121 toward a bottom and bent inward at an end thereof to form hooking portions 122*a*, cut-away portions 123 formed at portions, in which transverse and longitudinal portions of each supporting arm 121 are met, to be gradually directed upward toward the longitudinal portions, and shoulders 124 formed to extend from outer frames of connection portions between the retaining arms 122 and the flanges 121*a*, wherein at least one pair of movement preventing protrusions 112 are integrally formed at portions of the base 110 cut in the form of a "⊏" shape to face each other toward the flanges 121*a*, and the pair of movement preventing protrusions 112 are gradually bent inward toward a top thereof, and at least one nose preventing protrusion 121*b* is further provided at one of both opposed surfaces of the one pair of flanges 121*a* to be in point-contact.

However, these conventional fixtures are generally manufactured in the form of a clip, and the clip-shaped fixture has the following problems.

(1) The conventional fixtures (clip modules) have a structure which is not moved once they are fixed. For example, in case of a room lamp, a head lamp, and a headliner, since they are not moved and an external force is hardly applied to them, there is no problem. However, when the indoor handle which is grasped by a passenger and to which an external force is applied is fixed, there are some problems as follows.

(2) Since the fixture is manufactured so the retaining arms substantially serving as hooks are located to face each other and to be symmetrical vertically or horizontally, the external force applied to the indoor handle may not be uniformly dispersed to the retaining arms.

(3) That is, when the external force is applied in a direction in which an auxiliary handle is grasped and pulled downward, the external force is uniformly applied to the conventional fixture and thus the retaining arms. However, when the auxiliary handle is twisted or grasped to be inclined to one side, the conventional fixture is twisted by a force generated at this time, and thus the retaining arms are also twisted.

(4) In the retaining arms twisted as described above, the force is applied to one of the retaining arms or to one side, and thus the twisted retaining arms may be separated from or may escape from a coupling hole.

(5) This is caused by a structure in which the force applied to the indoor handle may not be dispersed to each retaining arm, even when being applied in any directions, i.e., a structure in which the retaining arms face each other.

(6) Meanwhile, the conventional fixture which is vulnerable to the twisting may be separated from or may escape from the coupling hole, when the indoor handle is used.

(7) When the fixture is separated, the fixture may bump against other construction elements and may generate noise, and thus the separation of the fixture may act as a factor which deteriorates riding comfort.

(8) The indoor handle is generally fixed by two fixtures, and when all of the fixtures are separated from the coupling hole, the indoor handle may fall into an interior of the vehicle, and thus a safety accident may occur.

(Patent document 1) Korean Patent Publication No. 10-2013-0090942 (published on Aug. 16, 2013)

(Patent document 2) Korean Patent No. 1359424 (registered on Jan. 29, 2014)

(Patent document 3) Korean Patent No. 1391230 (registered on Apr. 25, 2014)

SUMMARY OF THE INVENTION

The present invention is directed to a fixture for a vehicle, which is configured so that a plurality of retaining arms inserted into and caught by a coupling hole formed in a body panel are located on an imaginary circle, and arranged in the form of a cone so as to absorb an external force, even though the external force is applied in any directions, thereby being easily assembled, and which is capable of dispersing and absorbing twisting generated when an indoor handle installed using the fixture is used, and thus being prevented from escaping from or being separated from the coupling hole.

Also, the present invention is directed to a fixture for a vehicle, in which even-numbered retaining arms are formed to face each other on the imaginary circle, such that an external force generated when the indoor handle is used is dispersed and absorbed regardless of an applied direction of the external force, and a separation or an escape of the fixture is prevented, and thus a noise and a safety accident are reduced.

Also, the present invention is directed to a fixture for a vehicle, which is configured to be manufactured by a press processing, thereby having a simple structure to be easily manufactured and used at a low manufacturing cost, and also being massively manufactured to increase productivity.

According to an aspect of the present invention, there is provided a fixture for a vehicle, which is inserted into a coupling hole formed in a body panel to fix a head lamp, a room lamp, a headliner, or an indoor handle, including a base (100) having a fastening hole (110) formed in a center thereof; at least two guides (200) formed at the base (100) to be located on an imaginary circle (C) based on the fastening hole (110) and to be spaced at regular intervals from each other, and installed to be in close contact with an inner surface of the coupling hole; and at least two retaining arms (300) respectively formed between the two adjacent guides (200) so that longitudinally middle portions thereof are folded, and the folded portions are in contact with each other above the fastening hole (110), and a hooking portion (310) is formed at each end thereof, which is formed to be spread outward, so as to be inserted and caught into the coupling hole, wherein the at least two retaining arms (300) are arranged at the base (100) to form a cone shape.

The guide (200) may be formed to protrude above the base (100) and to be in close contact with the inner surface of the coupling hole while being horizontal with the base (100).

Even-numbered guides (200) and retaining arms (300) may be provided, and adjacent two guides (200) and adjacent two retaining arms (300) may be formed to face each other, respectively.

The retaining arm (300) may further have at least one reinforcing bead 320 formed in a lengthwise direction.

The fixture may be integrally formed through a press processing of a metal plate.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

| 100: base | 110: fastening hole |
| 200: guide | 300: retaining arm |
| 310: hooking portion | 320: reinforcing bead |

DETAILED DESCRIPTION OF THE INVENTION

Preferred embodiments of the present invention will be described in detail below with reference to the accompanying drawings. It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

(Construction)

Figure 1:
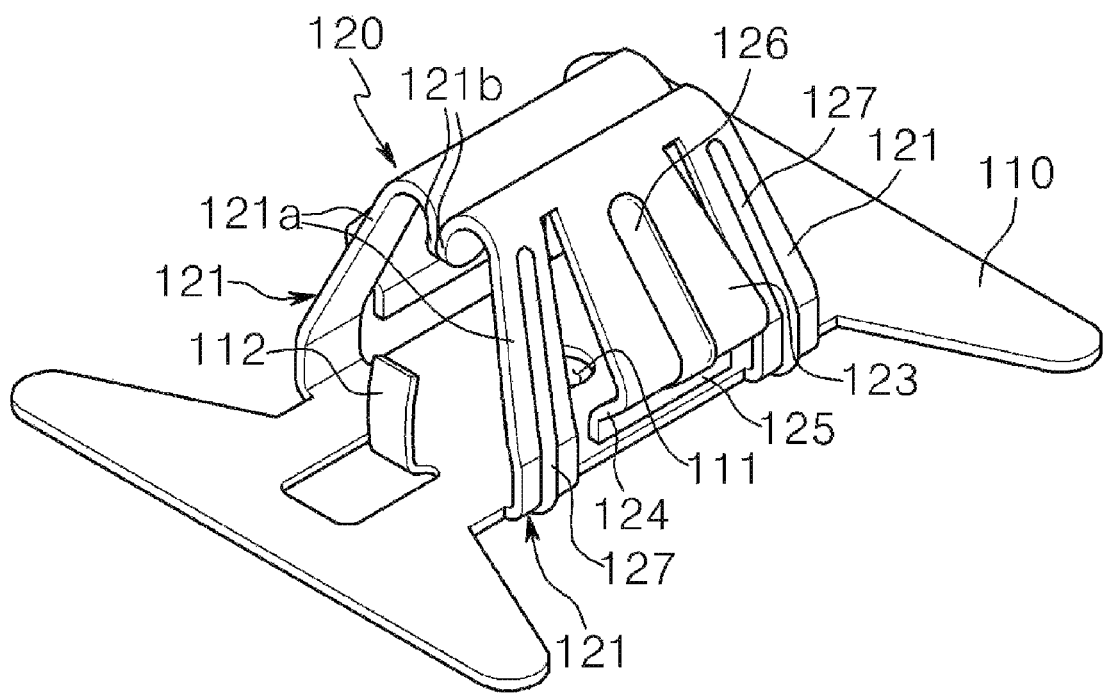
FIG. 1 is a representative view of Patent document 1.
Figure 2:
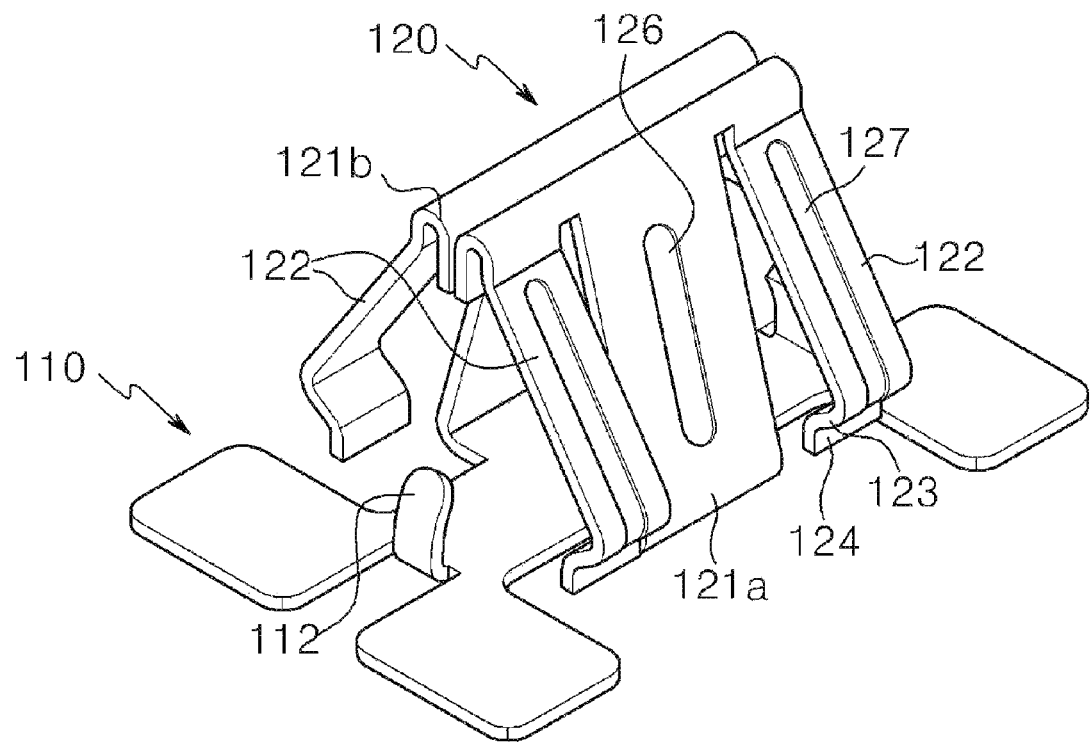
FIG. 2 is a representative view of Patent document 2.
Figure 3:
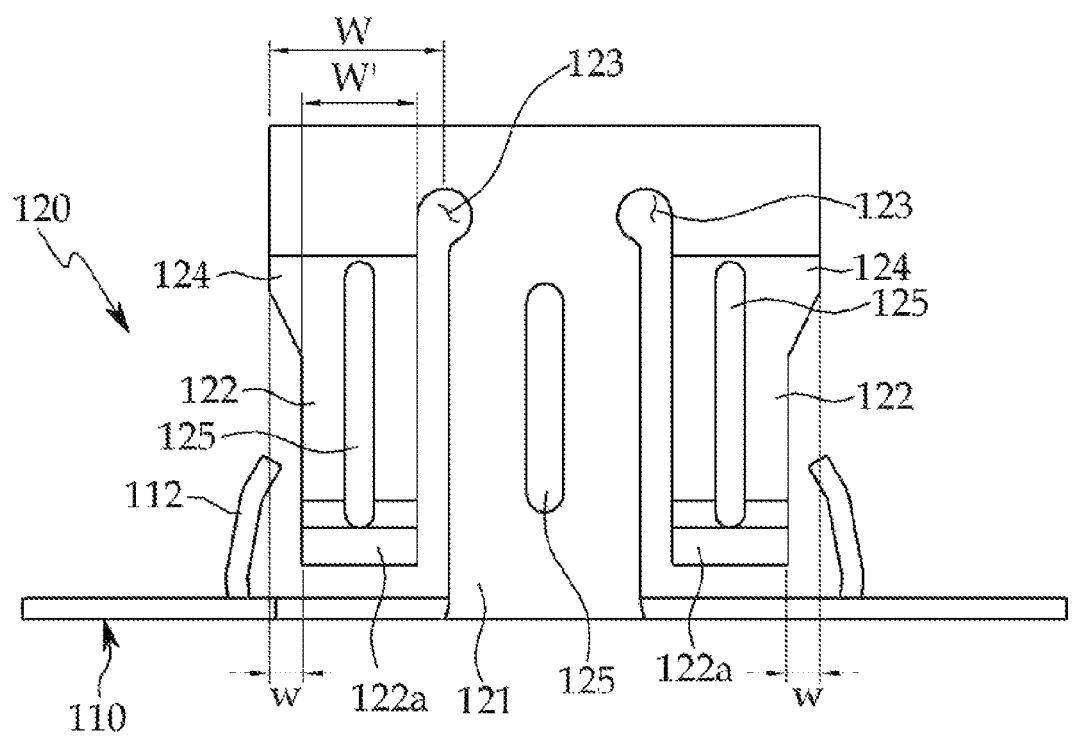
FIG. 3 is a representative view of Patent document 3.
Figure 4:
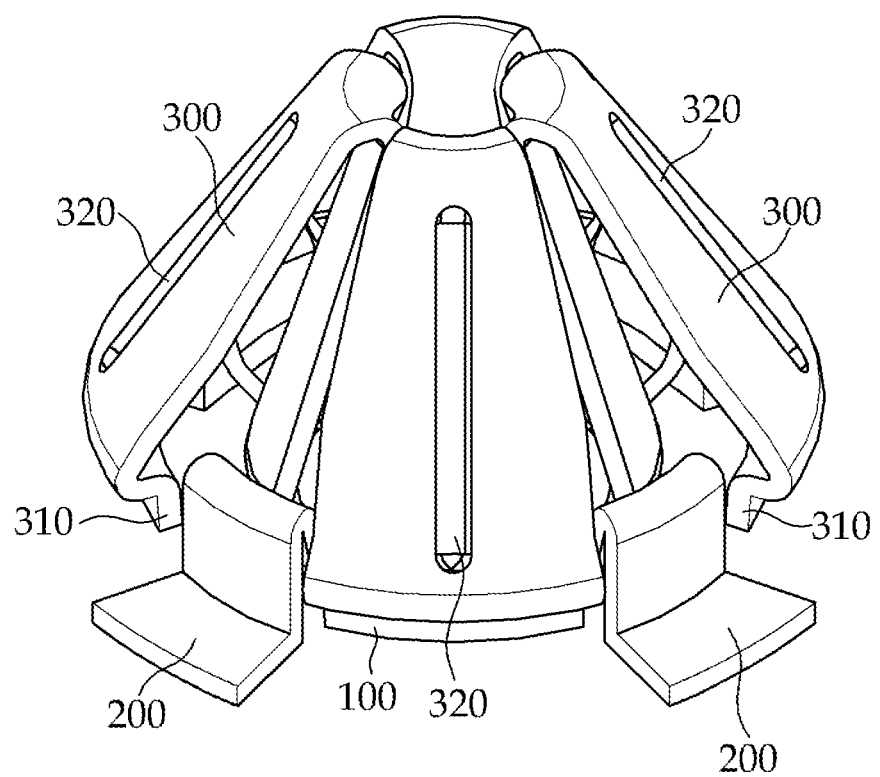
FIG. 4 is a perspective view illustrating an entire shape of a fixture for a vehicle according to the present invention.
Figure 5:
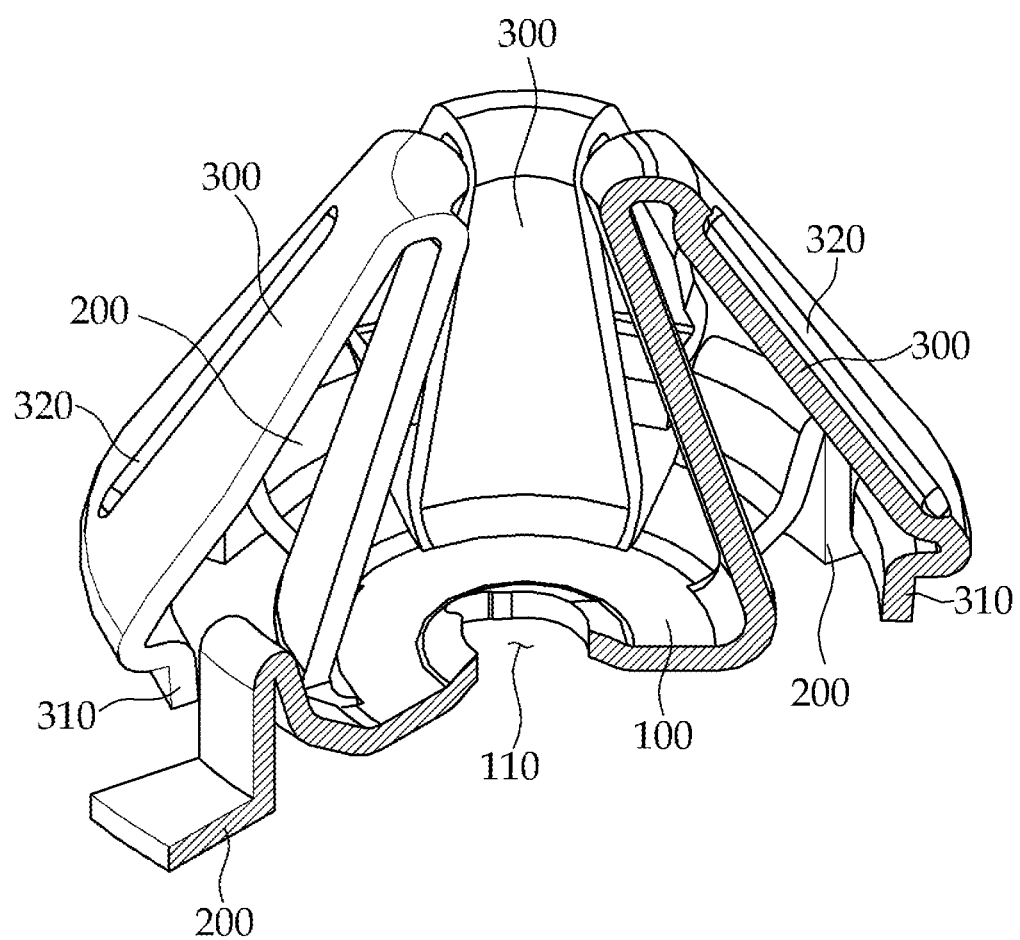
FIG. 5 is a partly cut-away cross-sectional perspective view illustrating an internal structure of the fixture for the vehicle according to the present invention.
Figure 6:
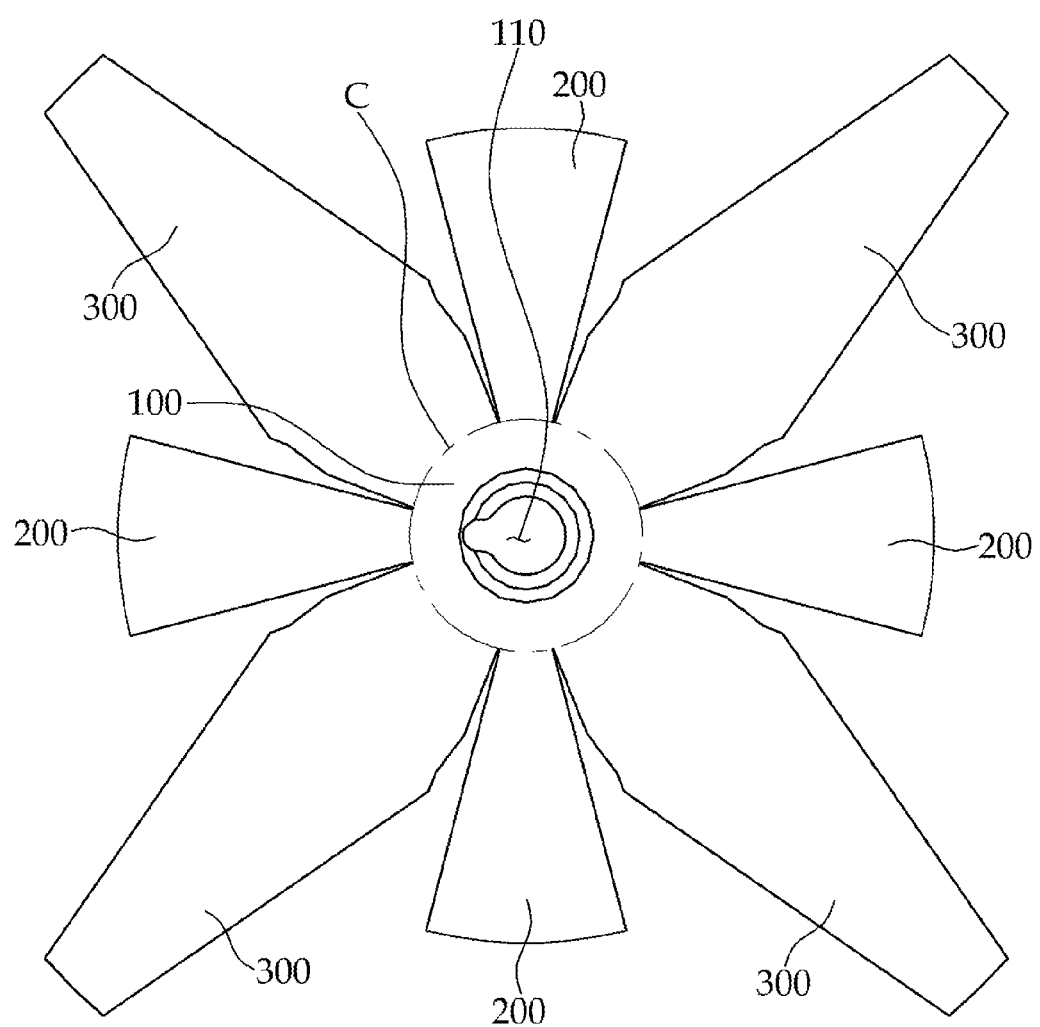
FIG. 6 is a development view illustrating a manufacturing process of the fixture for the vehicle according to the present invention.

As illustrated in FIGS. 4 to 6, a fixture for a vehicle according to the present invention includes a base 100 formed in a circular shape to have a fastening hole 110 formed in a center thereof, and at least two guides 200 and at least two retaining arms 300 alternately formed at edge portions of the base 100.

In particular, the present invention is used to fix a headliner, a room lamp, a head lamp, or an indoor handle by inserting the retaining arms 300 into a coupling hole formed in a body panel, and the retaining arms 300 are arranged in the form of a cone. Therefore, even though a force is applied in any directions of the fixture, the retaining arms 300 configured to perform coupling action disperse and absorb the force, and thus prevent the fixture of the present invention from being separated from or escaping from the coupling hole.

Figure 7:
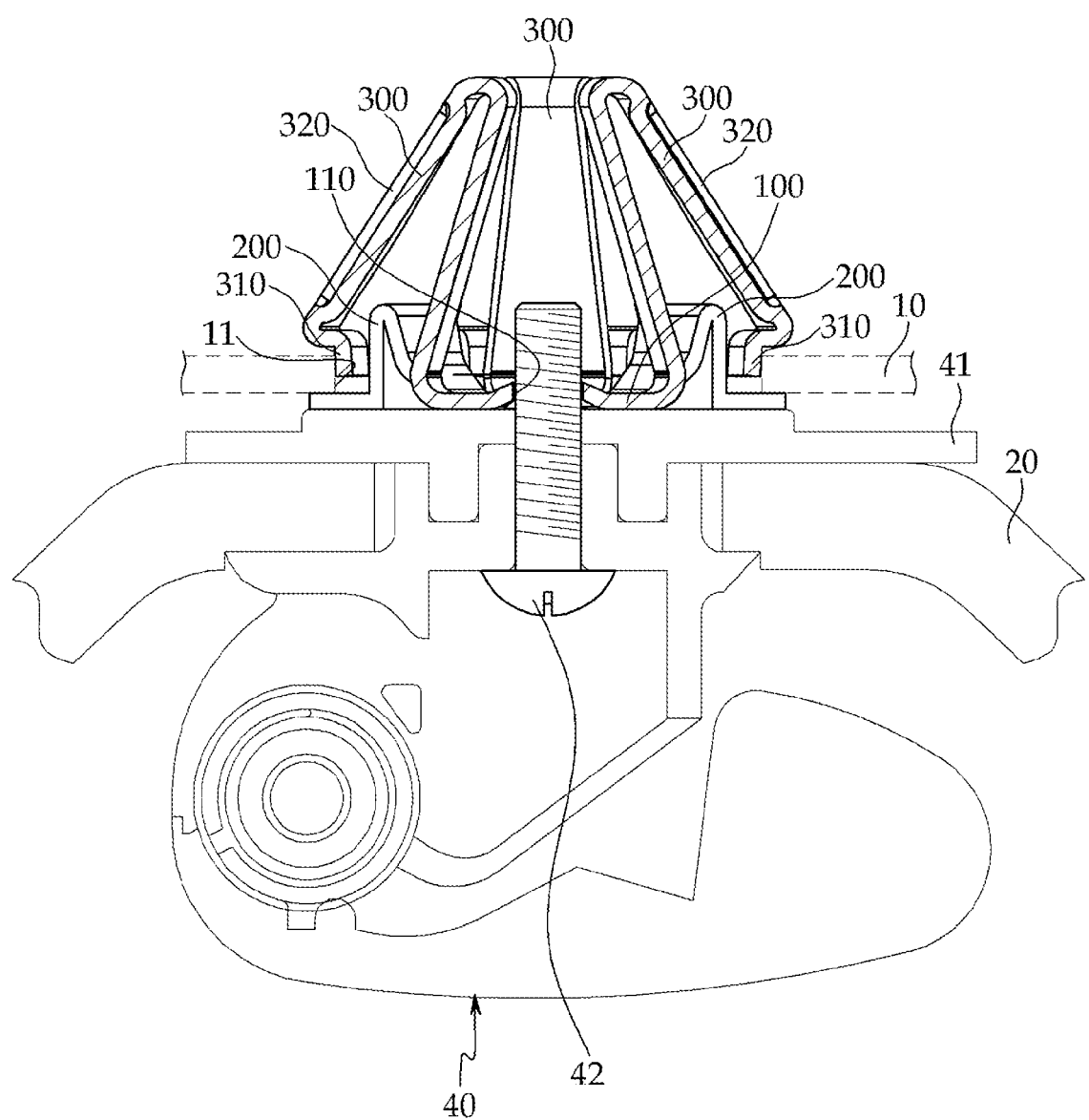
FIG. 7 is a cross-sectional view illustrating a state in which an indoor handle is fixed by the fixture for the vehicle according to the present invention.

The detailed description of such a structure is as follows. Here, the fixture of the present invention is used to fix the headliner, the room lamp, the head lamp, the indoor handle, or the like. In the specification, it is assumed that the fixture is installed at the indoor handle to which an external force is most frequently applied in an installed state, and thus which may be separated or disassembled. In FIG. 7, an unexplained reference numeral 20 is the headliner, 41 is a fixture plate installed between the body panel 10 and the headliner 20, 40 is the indoor handle, and 42 is a fastening means, such as a screw, onto which the indoor handle 40, the headliner 20, and the fixture plate 41 are inserted and which is fastened into the fastening hole 110.

As illustrated in FIGS. 4 to 6, the base 100 has the fastening hole 110 formed in a center thereof. The fastening hole 110 is used to fasten the fastening means (not shown) such as the screw used when the indoor handle is fastened.

In the preferred embodiment of the present invention, FIG. 6 illustrates an example in which the base 100 is formed of a circular plate having an imaginary circle C based on the fastening hole 110. However, the base 100 may be formed in a regular polygonal shape based on the fastening hole 110. At this time, it is preferable that the regular polygonal shape is an even-numbered polygonal shape such as a tetragonal shape, a hexagonal shape, and an octagonal shape. Retaining arms 300 to be described later are formed at opposed sides to face each other.

As illustrated in FIGS. 4 to 6, the guides 200 are formed to be located on the imaginary circle C, and thus serve to guide the fixture of the present invention when the fixture is inserted into the coupling hole and then support the fixture after the fixture is inserted.

As illustrated in FIGS. 4 to 6, at least two, preferably four guides 200 are provided to be in close contact with an inner surface of the coupling hole and thus to be supported by four points, when the fixture is inserted into the coupling hole, such that the fixture of the present invention is stably inserted and fixed into the coupling hole.

In the preferred embodiment of the preset invention, the four guides 200 are provided, but not limited thereto. Four or more guides 200 may be provided. At this time, odd-numbered guides 200 may be formed, but even-numbered guides 200 are preferably provided to face each other. Therefore, the fixture is stably supported, even when the external force is applied to one side.

Further, in the preferred embodiment of the present invention, the guides 200 are preferably formed to be horizontal with a surface of the base 100, such that a portion corresponding the imaginary circle C protrudes upward and is in close contact with the inner surface of the coupling hole. This is to allow a flat portion defined by the guide 200 and the base 100 to be in close contact with the body panel (not shown), thereby increasing a contact area therebetween and thus being stably supported.

As illustrated in FIGS. 4 to 6, each retaining arm 300 is formed between the adjacent two guides 200. In particular, longitudinally middle portions of the retaining arms 300 are folded to be in contact with each other above the fastening hole 110, as illustrated in FIGS. 4 and 5.

As illustrated in FIG. 5, the retaining arms 300 are formed to be spread outward, and a hooking portion 310 is formed at each end thereof to be caught by an edge portion of the coupling hole, when the fixture of the present invention is inserted into the coupling hole.

In the preferred embodiment of the present invention, a portion of each retaining arm 300, which is folded outward based on the longitudinally middle portion thereof, is preferably formed to be spread to an outer side of the fixture of the present invention, such that the fixture is generally formed in a cone shape, as illustrated in FIG. 4. Therefore, a cone portion allows an easy assembling operation of the fixture, when the fixture is inserted into the coupling hole, and also since the plurality of retaining arms 300 are arranged at predetermined positions on the imaginary circle C to have a symmetric structure, the fixture may be easily coupled and used. In particular, since the plurality of retaining arms 300 are arranged in various directions, the fixture may disperse and absorb the external force, even when the external force is applied in any directions.

Further, in the preferred embodiment of the present invention, the even-numbered retaining arms 300 are preferably formed to face each other. Therefore, even when the external force is applied to one side of the fixture of the present invention, a hooking function is always achieved at an opposite side thereof by the retaining arms 300, and also even though the fixture is twisted or inclined to one side by the external force, the fixture may stably support the indoor handle without the separation or escape from the coupling hole.

And, in the preferred embodiment of the present invention, the retaining arms 300 may have at least one reinforcing bead 320 formed at one surface thereof in a lengthwise direction, and thus may reinforce a structural strength. The drawings illustrate an example in which the reinforcing bead 320 is formed at an outward protruding portion of the longitudinally folded middle portion of the retaining arm 300 to be recessed toward an inner side of the fixture.

Meanwhile, the fixture of the present invention may be manufactured by a press working process of a metal plate, and thus may have a simple structure to be easily manufactured and used, and also may be massively manufactured.

To this end, as illustrated in FIG. 6, the fixture may be manufactured by cutting the metal plate by a length necessary to form each guide 200 and retaining arm 300 based on the circular base 100 and folding the guide 200 and the retaining arm 300 in the above-mentioned shape.

In the present invention as described above, since the plurality of retaining arms serving as hooks are formed in the cone shape to be arranged on the imaginary circle, even when a force is applied to the fixture in a direction which is twisted or inclined to one side, the retaining arms serving as hooks at predetermined positions of the inner surface of the coupling hole disperse and absorb the force, and thus stably support the fixture to be prevented from escaping from or being separated from the coupling hole.

The fixture for the vehicle according to the present invention has the following effects.

(1) In the case of the indoor handle to which the external force is applied by a passenger, as well as the headliner, the room lamp, and the head lamp to which the external force is hardly applied, once they are fixed, the external force can be effectively dispersed.

(2) That is, since the retaining arms serving as the hooks are arranged on the imaginary circle based on the center of the base to be spaced at regular intervals, even when the force is applied to the fixture, the force can be dispersed and absorbed through the retaining arms configured to support the fixture in all directions. Therefore, the fixture of the present invention can be prevented from easily escaping from or being separated from the coupling hole.

(3) Since the fixture is prevented from easily escaping from or being separated from the coupling hole, the noise generated when the fixture is separated from the coupling hole and then collides with other construction elements can be prevented, and the riding comfort can be increased, and a safety accident generated so that the indoor handle falls into an interior of the vehicle and hurts the passenger can be prevented.

(4) In particular, according to the present invention, since the retaining arms are arranged to face each other, even when the fixture is twisted or inclined to one side by a force, the retaining arms facing each other in all directions can stably disperse and absorb the force, and thus the separation or escaping prevention effect of the fixture can be further improved.

(5) Further, according to the present invention, since the plurality of retaining arms are formed in the cone shape, the fixture can be easily inserted and installed into the coupling hole, and also since the retaining arms can uniformly apply the force to the whole coupling hole, the fixture can be supported so as not to escape from or be separated from the coupling hole, even when the force is applied in any directions of the fixture.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A fixture for a vehicle, which is inserted into a coupling hole formed in a body panel to fix a head lamp, a room lamp, a headliner, or an indoor handle, comprising:
a base having a fastening hole formed in a center thereof; at least two guides formed at the base to be located on an imaginary circle based on the fastening hole and to be spaced at regular intervals from each other, and installed to be in close contact with an inner surface of the coupling hole; and at least two retaining arms respectively formed between the at least two guides so that longitudinally middle portions thereof are folded, and the folded portions are in contact with each other above the fastening hole, and a hooking portion is formed at each end thereof, which is formed to be spread outward, so as to be inserted and caught into the coupling hole,
wherein the at least two retaining arms are arranged at the base to form a cone shape.

2. The fixture of claim 1, wherein each of the at least two guides is formed to protrude above the base and to be in close contact with the inner surface of the coupling hole while being horizontal with the base.

3. The fixture of claim 1, wherein the at least two guides includes an even-number of guides and the at least two retaining arms includes an even-number of retaining arms, and wherein two guides of the at least two guides that are adjacent to each other and two retaining arms of the at least two retaining arms that are adjacent to each other are formed to face each other, respectively.

4. The fixture of claim 1, wherein at least one of the at least two retaining arms further has at least one reinforcing bead formed in a lengthwise direction.

5. The fixture of claim 1, wherein the fixture is integrally formed through a press processing of a metal plate.

6. The fixture of claim 2, wherein the fixture is integrally formed through a press processing of a metal plate.

7. The fixture of claim 3, wherein the fixture is integrally formed through a press processing of a metal plate.

8. The fixture of claim 4, wherein the fixture is integrally formed through a press processing of a metal plate.

* * * * *